G. R. EVANS.
ORE SLUICE AND CONCENTRATOR.

No. 189,928. Patented April 24, 1877.

Witnesses
Geo. H. Strong.
Owyn T. Stacy.

Inventor
Geo. R. Evans
By his attys
Dewey & Co.

UNITED STATES PATENT OFFICE.

GEORGE R. EVANS, OF CARSON CITY, NEVADA, ASSIGNOR OF THREE-FOURTHS OF HIS RIGHT TO EDGAR E. SCOTT, DIEUDONNÉ N. BRULE, AND ALEXANDER TREMBLAY.

IMPROVEMENT IN ORE SLUICES AND CONCENTRATORS.

Specification forming part of Letters Patent No. 189,928, dated April 24, 1877; application filed December 11, 1876.

*To all whom it may concern:*

Be it known that I, GEORGE R. EVANS, of Carson City, county of Ormsby and State of Nevada, have invented an Improved Ore Sluice and Concentrator; and I do hereby declare the following to be a full, clear, and exact description thereof, reference being had to the accompanying drawings.

My invention relates to a novel construction for a sluice and concentrator, for saving such valuable heavy metals or sulphurets as may be found in the tailings which escape from mills and other apparatus employed to work ores; and it consists in the employment of a sluice or table having a distributing-box at its upper end, said box receixing its supply of tailings and water from a head-box, which is provided with distributers upon its bottom.

Above the table is a box suspended upon bearings, so as to extend across the table, and this box receives water through a pipe and hose.

The water is distributed by a spreader within, and the water flows out through a slot in the bottom, so as to carry away the lighter slime, leaving the heavier particles and sulphurets. At the lower end of this table is a trough extending across from side to side, and it is provided with a pivoted top, which is worked by a lever so as to either lie flush with the bottom of the sluice, or it may be turned so as to act as a trap to catch the sulphurets whenever the table is sufficiently filled.

Figure 1:
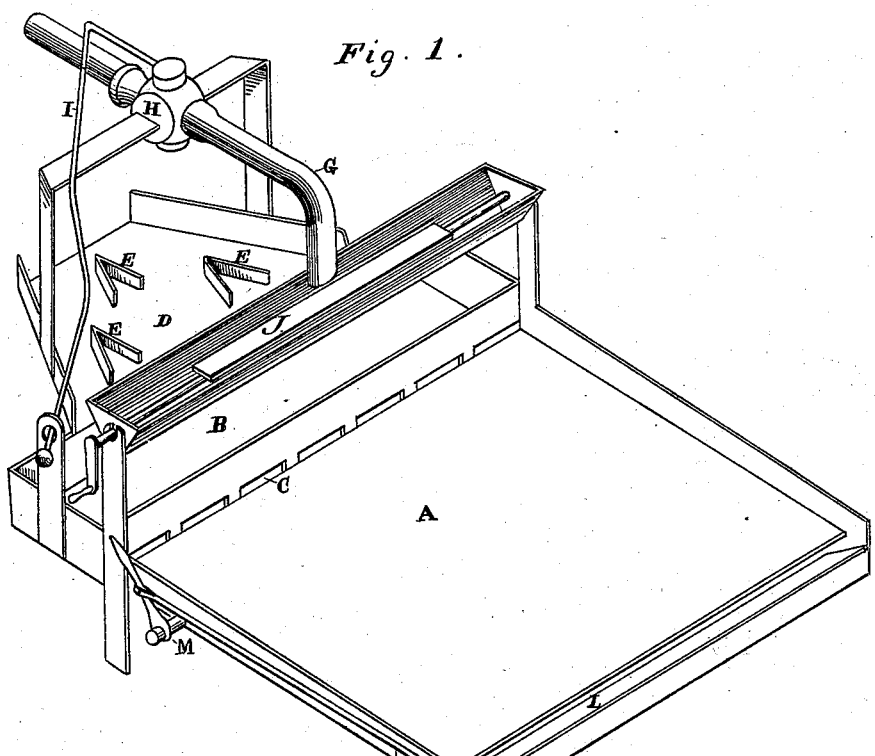
Figure 2:
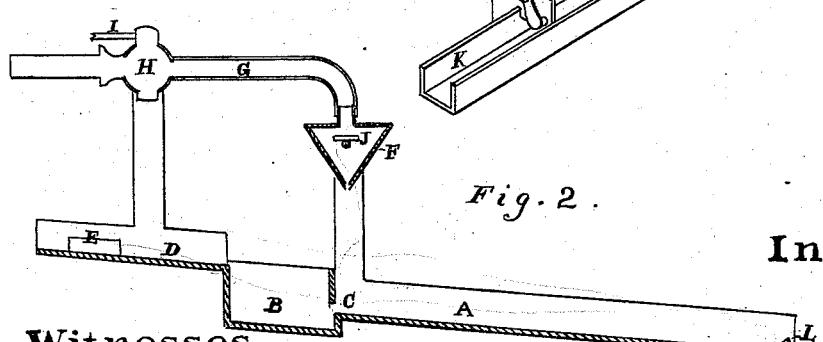

Referring to the accompanying drawings for a more complete explanation of my invention, Figure 1 is a perspective view with the cover of the water-box removed to show the location of the spreader-plate. Fig. 2 is a longitudinal section.

A is my sluice or concentrating table which is mounted upon supports so as to stand at a suitable inclination to allow the lighter slime to pass off, but being flat enough to allow the sulphurets and other valuable heavy residue to settle and remain upon it.

A box or trough, B, is formed extending across the upper end of my table, and its front has slots C made in it so as to distribute the tailings, which are received in it, sufficiently thinned with water, and by this means spread evenly over the entire surface of the table.

The tailings are received in this distributing-trough from a head box or sluice, D, which is provided with V-shaped pieces E, these being secured with their apices toward the stream of material, and serving to insure an even discharge from the head-box into the trough B.

Above the head of the table A is mounted a triangular or other suitably-shaped box, F, which extends entirely across the table, and is journaled in suitable bearings, so that it is free to turn. This box receives water through a centrally-located pipe, G, having an adjustable stop-cock, H, so arranged as to be operated by a handle, I. Within this box is a flat surface, J, which I call a spreader, and this receives the water from the pipe, and distributes it from one end to the other of the box F. The lower angle of this box has a slit made throughout its length, so as to allow the water to escape, and falling upon the table to wash away the lighter refuse matter, allowing the clear sulphurets to remain.

In order to collect these sulphurets, after a sufficient amount has accumulated upon the table, I form a trap at the lower end in the following manner: A trough or box, K, extends across the full width of the table, below its level, and a cover, L, is hinged to the trough, so that when closed it will lie flush with the table, and form a continuation of it. Over this continuous floor the waste material is allowed to flow, until the sulphurets have accumulated upon the table in a considerable quantity.

The cover or floor L is then turned upon its axis by means of a lever-arm, M, and suitable connections, and this causes everything to fall into the trough K.

An increased flow of water over the table carries all the sulphurets into this trough, after which the cover may be returned to its first position, and the flow of tailings resumed.

Having thus described my invention, what

I claim as new, and desire to secure by Letters Patent, is—

1. The table A, having the box B, with the distributing-opening C, and the head-box D, with the V or other suitably shaped pieces E, to secure an even discharge upon the table, substantially as herein described.

2. The water-receiver F, supported upon journals, and provided with a spreader, J, whereby the water received from the central pipe G flows equally from the entire length of the box through a suitable opening, substantially as described.

In witness whereof I have hereunto set my hand and seal.

GEORGE R. EVANS. [L. S.]

Witnesses:
 JOHN TRAFF,
 JAMES HUNT.